US012678969B2

(12) United States Patent
Thomason et al.

(10) Patent No.: US 12,678,969 B2
(45) Date of Patent: Jul. 14, 2026

(54) ROBOT FOR MOVING AND DE-CAPPING COLLECTION CONTAINERS

(71) Applicant: IDETIC LLC, Chamblee, GA (US)

(72) Inventors: Will Isaac Thomason, Chamblee, GA (US); Robert Kendall Ufford, Acworth, GA (US); Hilario Alberto Urquieta, Fair Oaks Ranch, TX (US)

(73) Assignee: IDETIC LLC, Chamblee, GA (US)

( * ) Notice: Subject to any disclaimer, the term of this patent is extended or adjusted under 35 U.S.C. 154(b) by 213 days.

(21) Appl. No.: 18/404,296

(22) Filed: Jan. 4, 2024

(65) Prior Publication Data

US 2024/0217112 A1 Jul. 4, 2024

Related U.S. Application Data

(60) Provisional application No. 63/436,966, filed on Jan. 4, 2023.

(51) Int. Cl.
B25J 9/16 (2006.01)
B25J 9/10 (2006.01)
(Continued)

(52) U.S. Cl.
CPC ........... B25J 11/005 (2013.01); B25J 9/1035 (2013.01); B25J 9/1661 (2013.01); B25J 15/0052 (2013.01); B25J 15/086 (2013.01)

(58) Field of Classification Search
CPC .... B25J 15/0052; B25J 9/1661; B25J 15/086; B25J 11/005; B25J 9/1035
See application file for complete search history.

(56) References Cited

U.S. PATENT DOCUMENTS 4,955,653 A * 9/1990 Beals ................... B25J 15/0273
901/38
8,944,192 B2 * 2/2015 Nance ................... F22B 37/005
180/7.1
(Continued)

OTHER PUBLICATIONS

Low et al., Sensorized Reconfigurable Soft Robotic Gripper System for Automated Food Handling, 2021, IEEE, p. 3232-3343 (Year: 2021).*

(Continued)

*Primary Examiner* — Mcdieunel Marc
(74) *Attorney, Agent, or Firm* — Thomas | Horstemeyer, LLP

(57) ABSTRACT

A robot system is provided for moving and de-capping collection containers. The system can include a robotic arm having a plurality of grippers, where the plurality of grippers is configured to move a plurality of collection containers. Additionally, the system can include a decapper configured to remove a plurality of caps corresponding to the plurality of collection containers. The system further includes a computing device comprising a processor and a memory, and machine-readable instructions stored in the memory that, when executed by the processor, cause the computing device to align the plurality of grippers with the plurality of collection containers, where the plurality of grippers are connected to a distal end of the robotic arm. The instructions can further cause the computing device to cause the plurality of grippers to grip the plurality of collection containers, move the plurality of collection containers to the decapper, and de-cap the collection containers.

15 Claims, 19 Drawing Sheets

(51) Int. Cl.
  B25J 11/00     (2006.01)
  B25J 15/00     (2006.01)
  B25J 15/08     (2006.01)

(56) References Cited

U.S. PATENT DOCUMENTS

| | | | | |
|---|---|---|---|---|
| 9,082,454 | B2 * | 7/2015 | Yao | G11B 25/043 |
| 9,833,903 | B1 * | 12/2017 | Kuffner | B25J 9/1612 |
| 9,840,010 | B2 * | 12/2017 | Lee | B23Q 3/15713 |
| 10,589,949 | B2 * | 3/2020 | Peters | B25J 15/0052 |
| 10,604,359 | B2 * | 3/2020 | Nesbit | B65G 49/061 |
| 11,059,075 | B2 * | 7/2021 | McCoy, Jr. | B07C 5/3422 |
| 11,752,644 | B2 * | 9/2023 | Lin | B25J 15/0641 |
| | | | | 294/183 |
| 11,904,468 | B2 * | 2/2024 | Mizoguchi | B25J 19/023 |
| 2005/0036879 | A1 * | 2/2005 | Jhaveri | B25J 9/1682 |
| | | | | 414/751.1 |
| 2008/0089190 | A1 * | 4/2008 | Green | G11B 17/225 |
| 2019/0329425 | A1 * | 10/2019 | Ochiishi | B25J 9/1664 |
| 2021/0023714 | A1 * | 1/2021 | Zhang | H04N 13/254 |
| 2022/0203562 | A1 * | 6/2022 | Brown | B25J 9/1697 |
| 2023/0305030 | A1 * | 9/2023 | Silbert | G01N 35/00732 |

OTHER PUBLICATIONS

Zwirnmann et al., Towards Flexible Biolaboratory Automation: Container Taxonomy-Based, 3D-Printed Gripper Fingers*, 2023, IEEE, p. 6823-6830 (Year: 2023).*
D'Alessandro et al., Robotized sorter for blood classification using RFID tags, 2022, IEEE, p. 1-6 (Year: 2022).*
Gao et al., The New Dexterity Adaptive Humanlike Robot Hand: Employing a Reconfigurable Palm for Robust Grasping and Dexterous Manipulation, 2023, IEEE, p. 10310-10316 (Year: 2023).*
Galfarsoro et al., Analysis of vibration induced by cogging torque in permanent-magnet synchronous motors, 2017, IEEE, p. 1-6 (Year: 2017).*
Nur et al., Enhancement of Cogging Torque Reduction on Inset Permanent Magnet Generator by Using Magnet Edge Shaping Method, 2018, IEEE, p. 429-434 (Year: 2018).*
Cao et al., Cogging Torque Reduction for Outer Rotor Interior Permanent Magnet Synchronous Motor, 2011, IEEE, p. 2689-2693 (Year: 2020).*
Hwang et al., Design optimization for cogging torque minimization and efficiency maximization of a high-speed PM motor, 2009, IEEE, p. 938-943 (Year: 2009).*

* cited by examiner

100

146

100

100

186

ROBOT FOR MOVING AND DE-CAPPING COLLECTION CONTAINERS

CROSS-REFERENCE TO RELATED APPLICATION

This application claims priority to and the benefit of co-pending U.S. provisional application entitled "ROBOT FOR MOVING AND DE-CAPPING COLLECTION CONTAINERS" having Ser. No. 63/436,966, filed on Jan. 4, 2023, which is hereby incorporated by reference in its entirety.

BACKGROUND

Specimens such as blood can be collected from a patient and stored in test tubes, vials, and other containers. These containers can be placed in a storage rack for accessioning and archival processing. Conventional approaches for accessioning and archival processing often rely on moving and de-capping one container at a time. Such approaches can be time intensive, error prone, and may lead to contamination of the specimens.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

In many laboratory settings, specimens such as blood or other materials can be stored in test tubes, vials, or other containers. When performing tests on the specimens, oftentimes a batch approach is used for efficiency. Using conventional approaches, a technician may be required to move and de-cap numerous different containers per batch by hand. Such a manual process can be time consuming, error-prone, and have a high risk of contamination.

Disclosed are various systems and methods for moving and de-capping collection containers. In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principles disclosed by the following illustrative examples.

Figure 1:
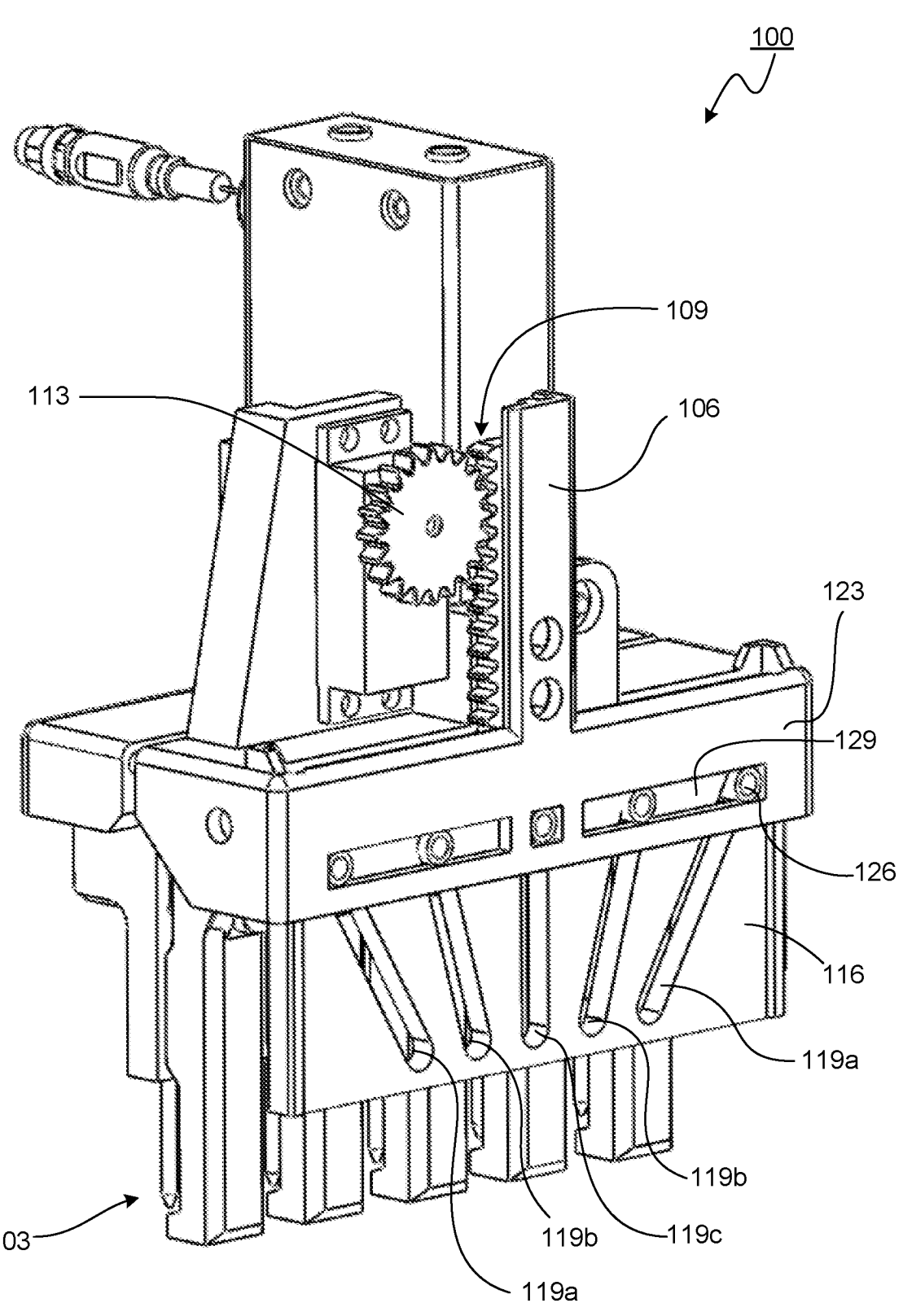
FIG. 1 is an example perspective view of a robotic gripper according to various embodiments of the present disclosure.

With reference to FIG. 1, shown is an example of a robotic arm 100 having a plurality of grippers 103 positioned at a distal end of the robotic arm 100. The robotic arm 100 can comprise a vertical shaft 106. In some embodiments, the vertical shaft 106 can have a cogged portion 109 along a first side of the vertical shaft 106. The cogged portion 109 of the vertical shaft 106 can be aligned with a cogwheel 113. The cogwheel 113 can be turned using a servo motor, the cogs on the cogwheel 113 interacting with the cogged portion 109 of the vertical shaft 106 and causing the vertical shaft 106 to be raised or lowered. In some embodiments, the vertical shaft 106 can be raised or lowered using another means to produce linear motion such as a scissor extender, telescoping member, or linear actuator, i.e., screw type, wheel and axle type, cam, hydraulic, pneumatic, piezoelectric, or any other form of linear actuator as can be appreciated.

Figure 3:
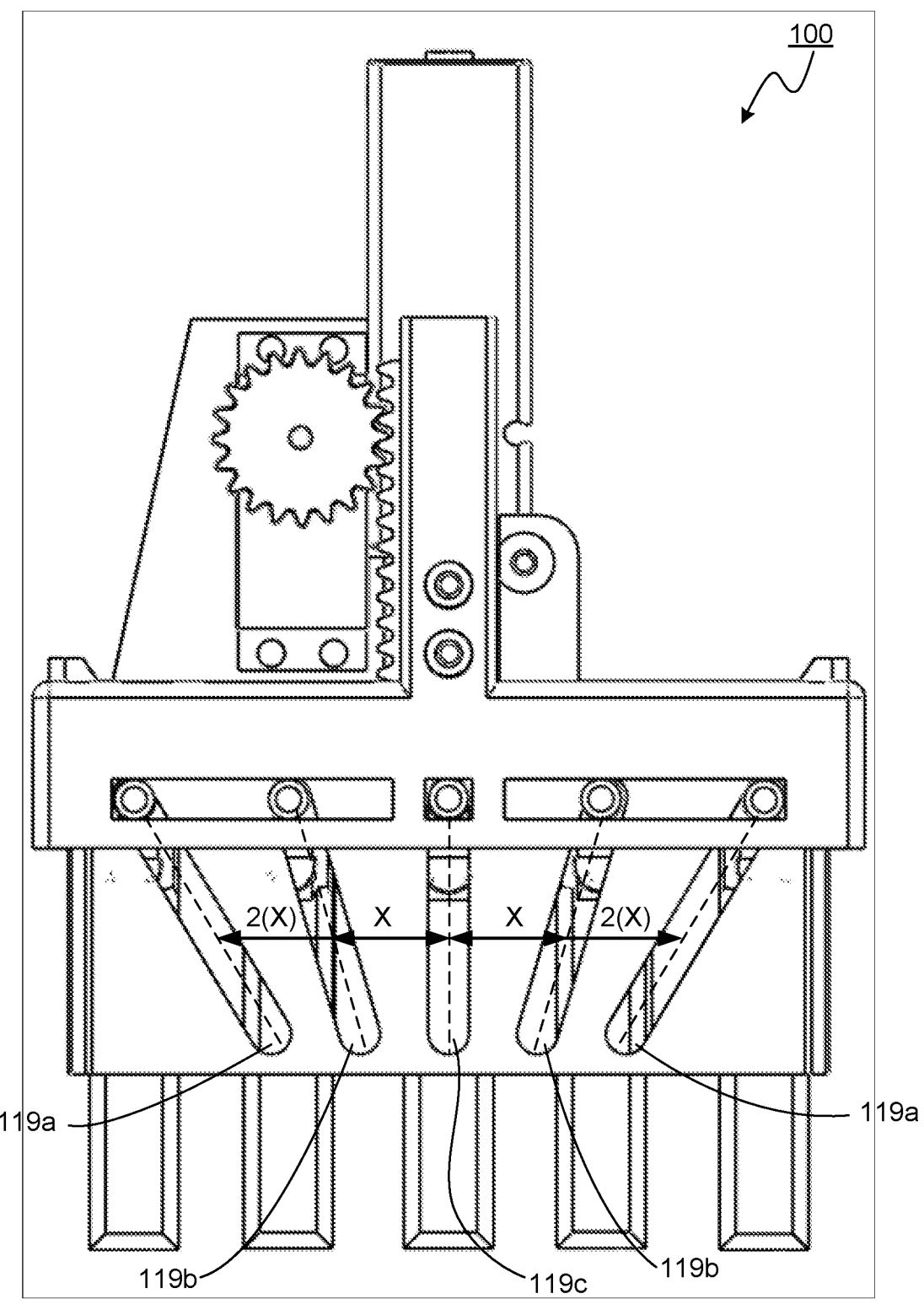
FIG. 3 is an example front view of a robotic gripper according to various embodiments of the present disclosure.

The vertical shaft 106 can be connected to a plate 116 having a plurality of angled tracks 119. In some embodiments, individual angled tracks 119 can be elongated through-holes, as shown in FIGS. 1, 3, 4, and 9. In other embodiments, individual angled tracks 119 can comprise elongated grooves in the plate 116. In some embodiments, individual angled tracks 119 can comprise raised track such as a v-slot track, flat track, or other type of track or rail. Individual angled tracks 119 can be arranged such that a first pair of angled tracks 119a (FIG. 1) are equally angled away from a second pair of angled tracks 119b, the second pair of angled tracks 119b are equally angled away from a central angled track 119c, and the central angled track 119c is vertical. In some embodiments, the angled tracks 119 are positioned such that the distance between the center angled track 119c and either of the second pair of angled tracks 119b is represented by X (X being a numerical distance), and the distance between the second pair of angled tracks 119b and the center angled track 119c is 2(X) (FIG. 3). In some embodiments, a third pair of angled tracks 119 can be arranged such that the third pair of angled tracks 119 are the outermost pair. The distance between the center angled track 119*c* and third pair of angled tracks 119 can be 3(X). In some embodiments, this relationship holds true no matter where along the angled tracks 119 the distance is measured. In addition, the individual angled tracks 119 can be arranged such that the distal ends of the individual angled tracks 119 are equally spaced along the plate 116.

The vertical shaft 106 can be connected to a horizontal member 123. The plurality of grippers 103 are connected to the horizontal member 123. The plurality of grippers 103 are configured to glide along the horizontal member 123. In some embodiments, the plurality of grippers 103 include extension elements 126. As shown in FIGS. 1, 3, 4, and 9, the extension elements 126 can be configured to fit inside a track 129 included in the horizontal member 123. In some embodiments, the plurality of grippers 103 can include a hook or ring which wholly or partially encircles the horizontal member 123. The extension elements 126 can also be configured to fit within respective angled tracks 119.

Figure 2:
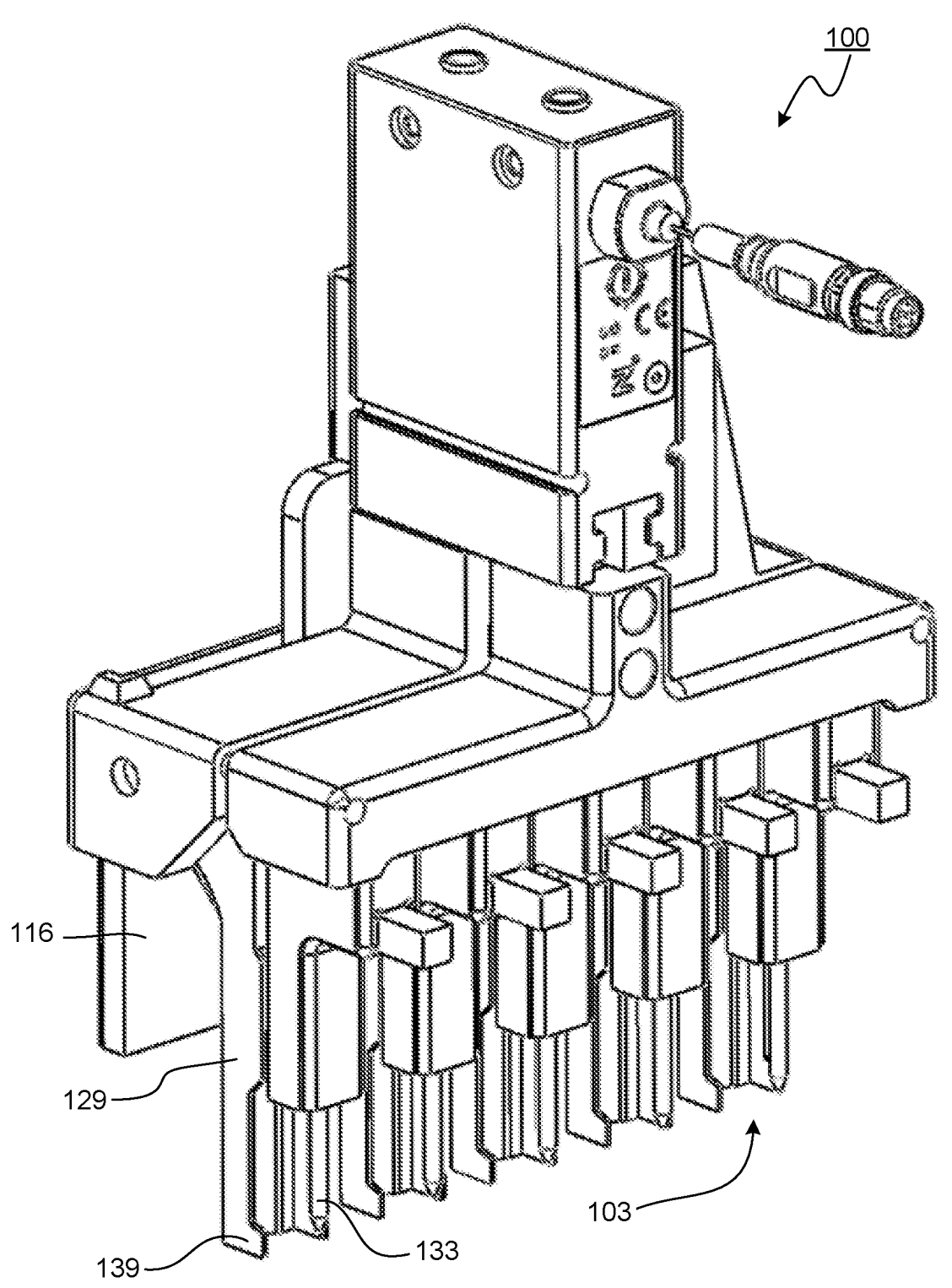
FIG. 2 is an example perspective view of a robotic gripper according to various embodiments of the present disclosure.

In FIG. 2, shown is a perspective view of the example robotic arm 100 of FIG. 1, showing the rear side of the robotic arm 100. As shown in FIG. 2, individual of the plurality of grippers 103 can comprise a first finger 129 and a second finger 133. The plurality of grippers 103 can operate by aligning individual grippers 103 with individual collection containers 136, separating the first finger 129 and the second finger 133, descending over the collection containers 136, and bringing the first finger 129 and the second finger 133 together until individual collection containers 136 are gripped between the first finger 129 and the second finger 133, and lifting the collection containers 136. In some embodiments, the first finger 129 includes a ledge 139 at a distal end of the first finger 129 (FIG. 2). The ledge 139 can be configured to support a collection container 136 by a cap 143 on the collection container 136, making it easier for the gripper 103 to lift the collection container 136. In some embodiments, the first finger 129 and the second finger 133 include ledges 139 to grip the collection container 136 by its cap 143.

With respect to FIG. 3, shown is a front-view of the example robotic arm 100 of FIGS. 1 and 2. As seen in FIG. 3, the robotic arm 100 can be configured such that when the vertical shaft 106 is in a down position, or extended position, the angled tracks 119 in the plate 116 force the extension elements 126, and thus, the individual grippers 103 further apart. In some embodiments, the angled tracks 119 can be configured such that when the vertical shaft 106 is in an up position, or retracted position, the individual grippers 103 are further apart.

Figure 4:
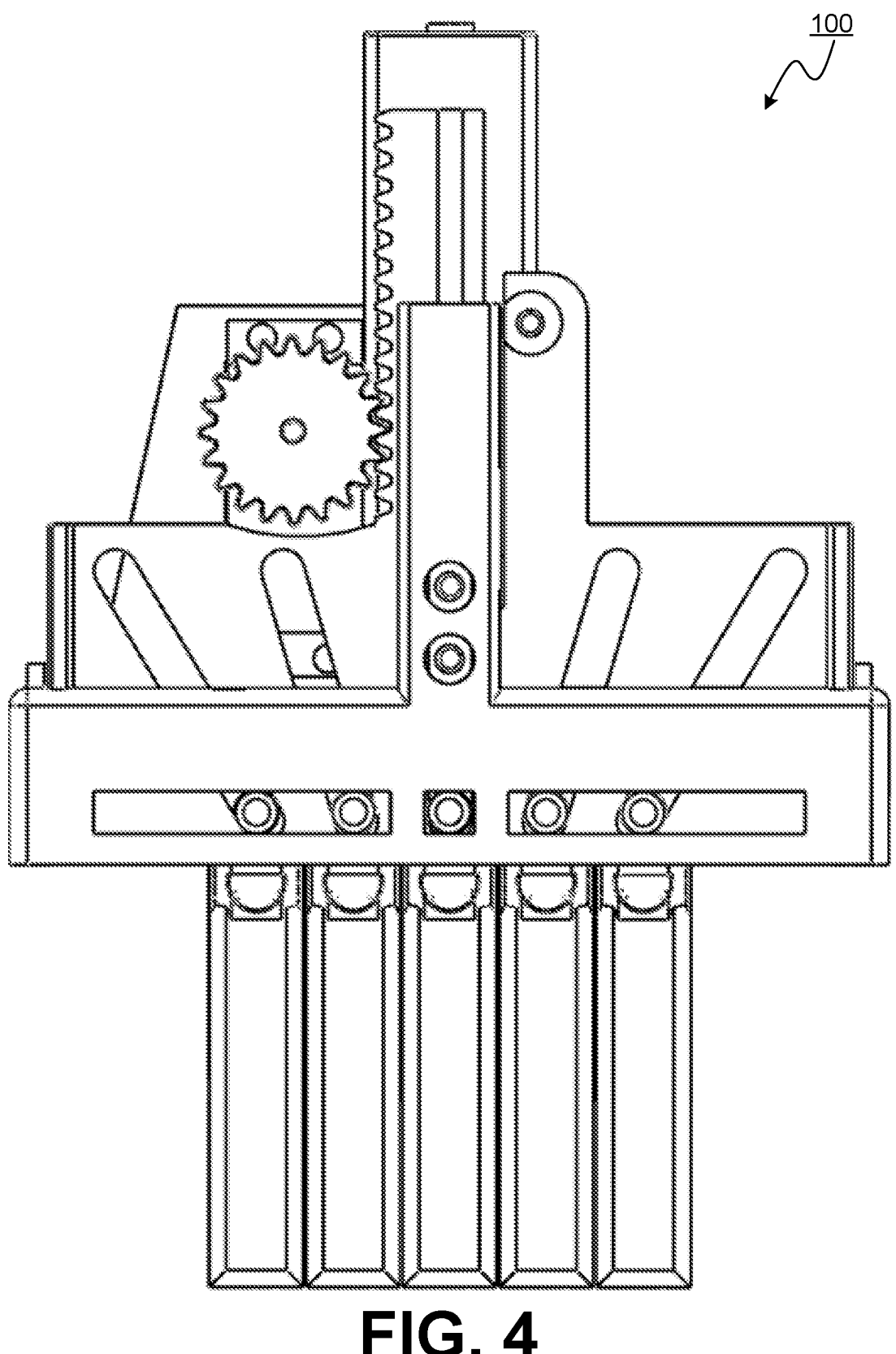
FIG. 4 is an example front view of a robotic gripper according to various embodiments of the present disclosure.

As seen in FIG. 4, the robotic arm 100 can be configured such that when the vertical shaft is in an up position, or retracted position, the angled tracks 119 in the plate 116 force the extension elements 126, and thus, the individual grippers 103 closer together. In some embodiments, the angled tracks 119 can be configured such that when the vertical shaft is in a down position, or an extended position, the individual grippers 103 are closer together.

Figure 5:
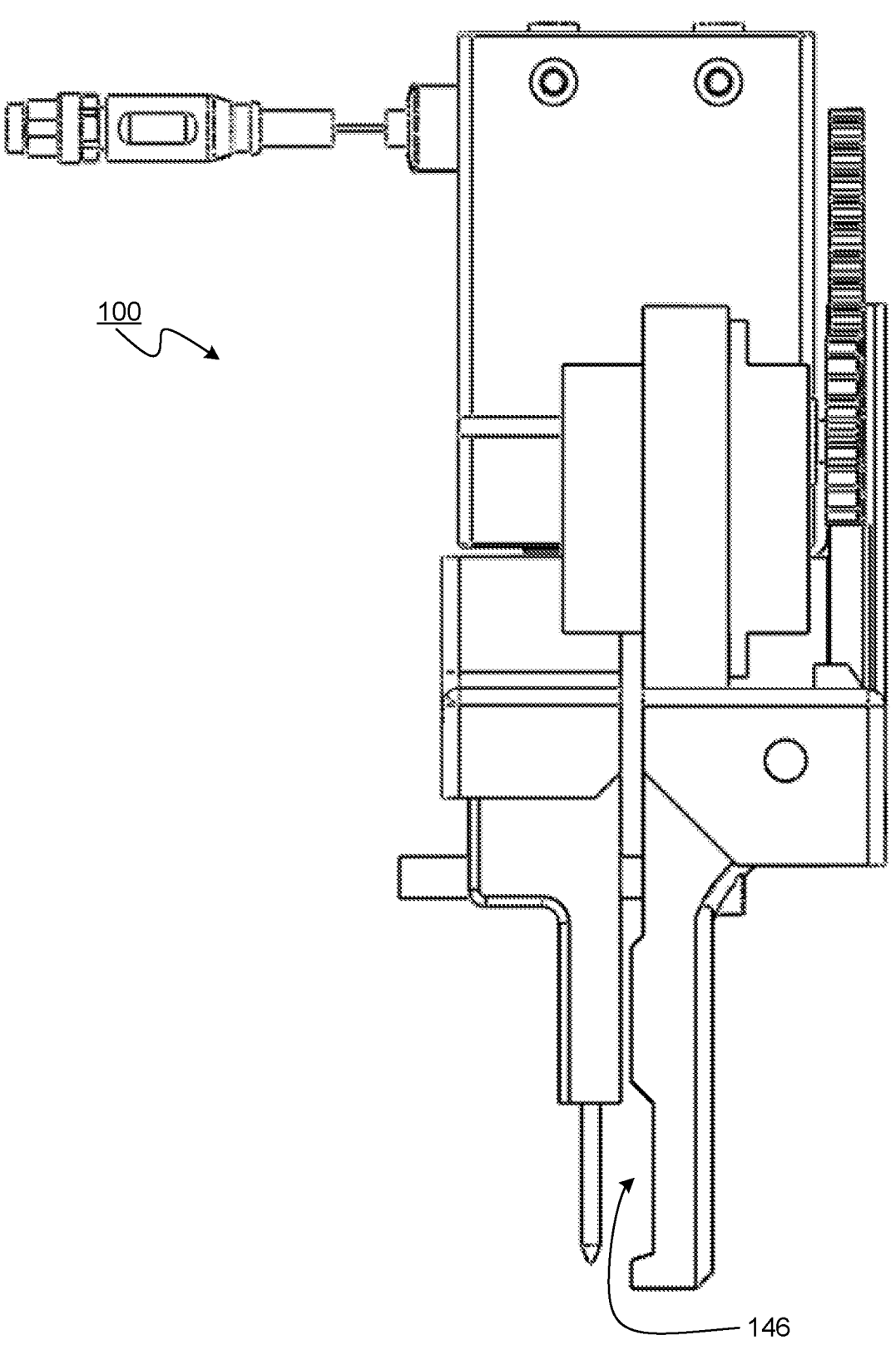
FIG. 5 is an example side view of a robotic gripper according to various embodiments of the present disclosure.

FIG. 5 depicts an example side view of the robotic arm 100 and grippers 103. The gripper 103 depicted can comprise a first finger 129 and a second finger 133. The first finger 129 can include a ledge 139 configured to support a collection container 136 by a cap 143. In some embodiments, the ledge 139 can comprise a portion of a cap recess 146 disposed on an inner side of the first finger 129.

Figure 6:
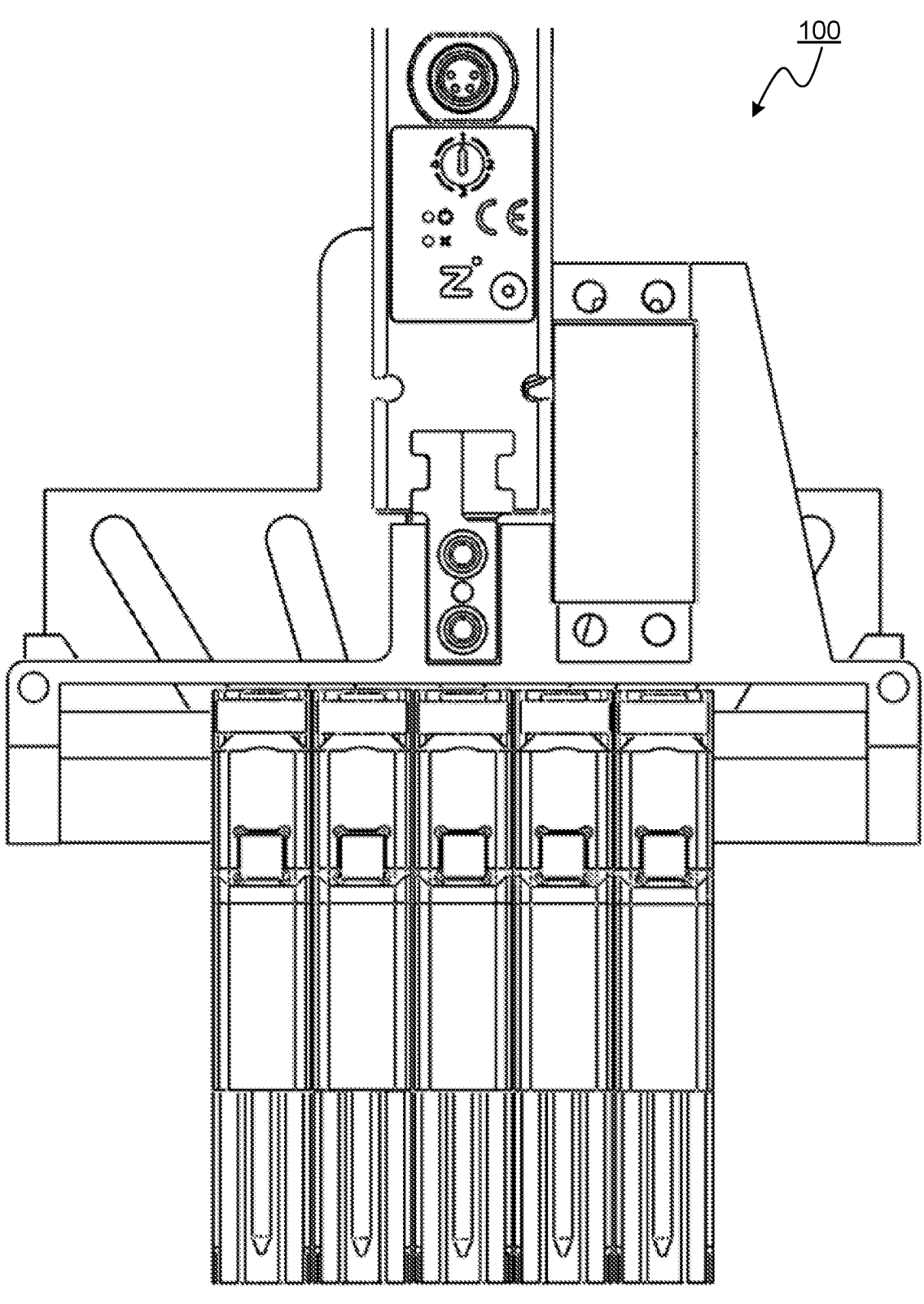
FIG. 6 is an example rear view of a robotic gripper according to various embodiments of the present disclosure.
Figure 7:
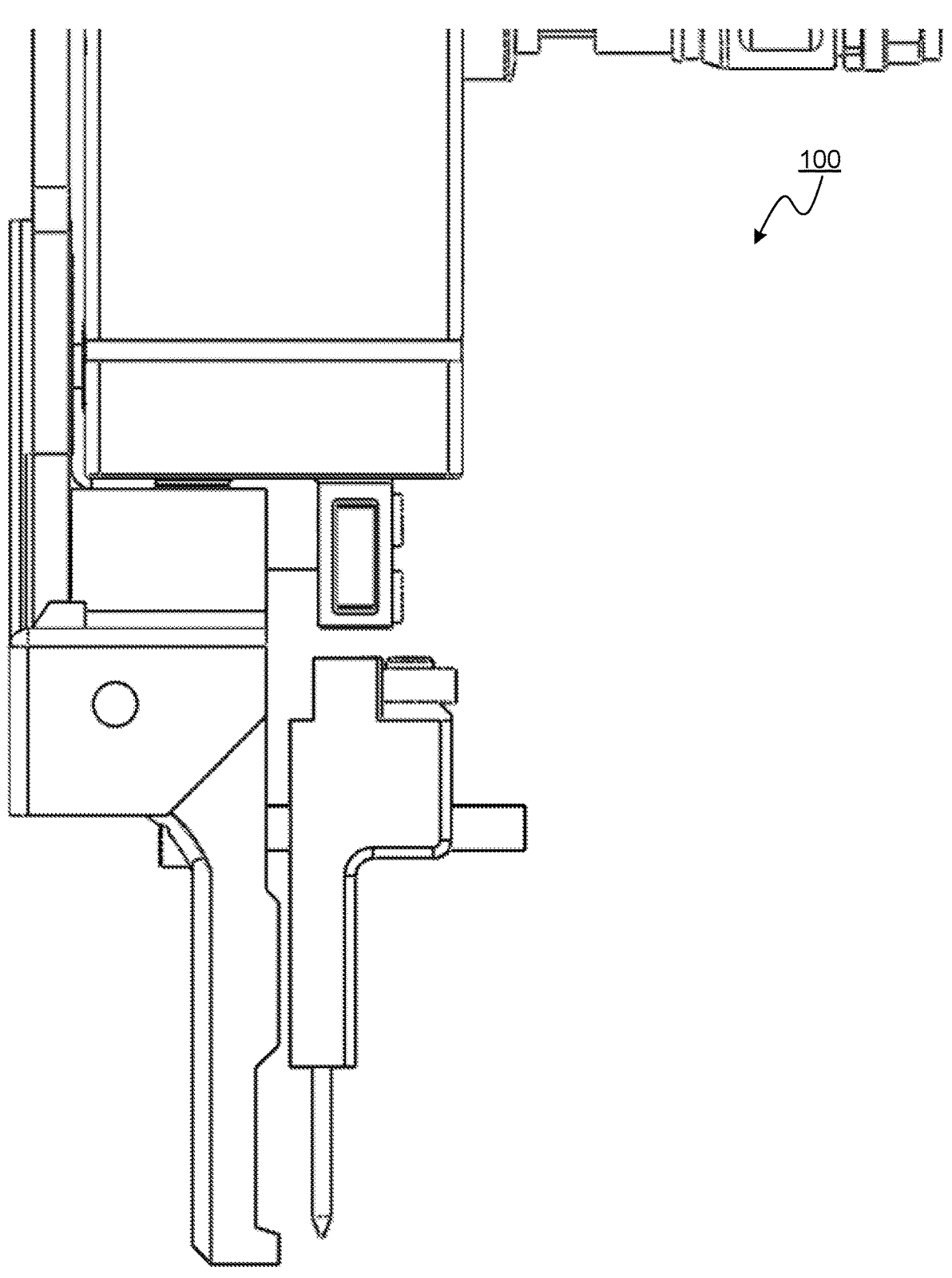
FIG. 7 is an example side view of a robotic gripper according to various embodiments of the present disclosure.
Figure 8:
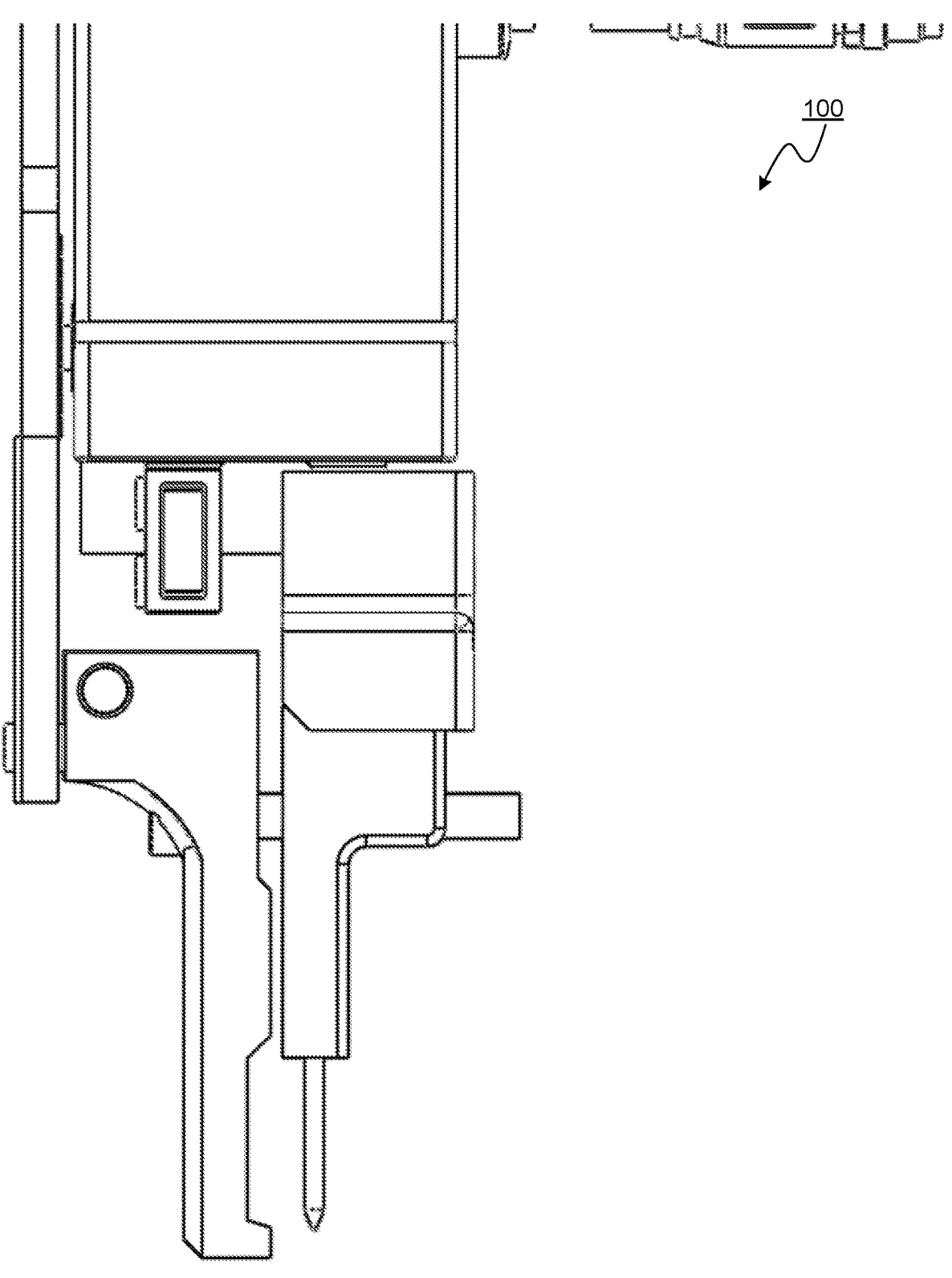
FIG. 8 is an example side view of a robotic gripper according to various embodiments of the present disclosure.

FIG. 6 is a rear view of an example robotic arm 100. FIG. 7 is a side view of an example robotic arm 100. FIG. 8 is another side view of an example robotic arm 100.

Figure 9:
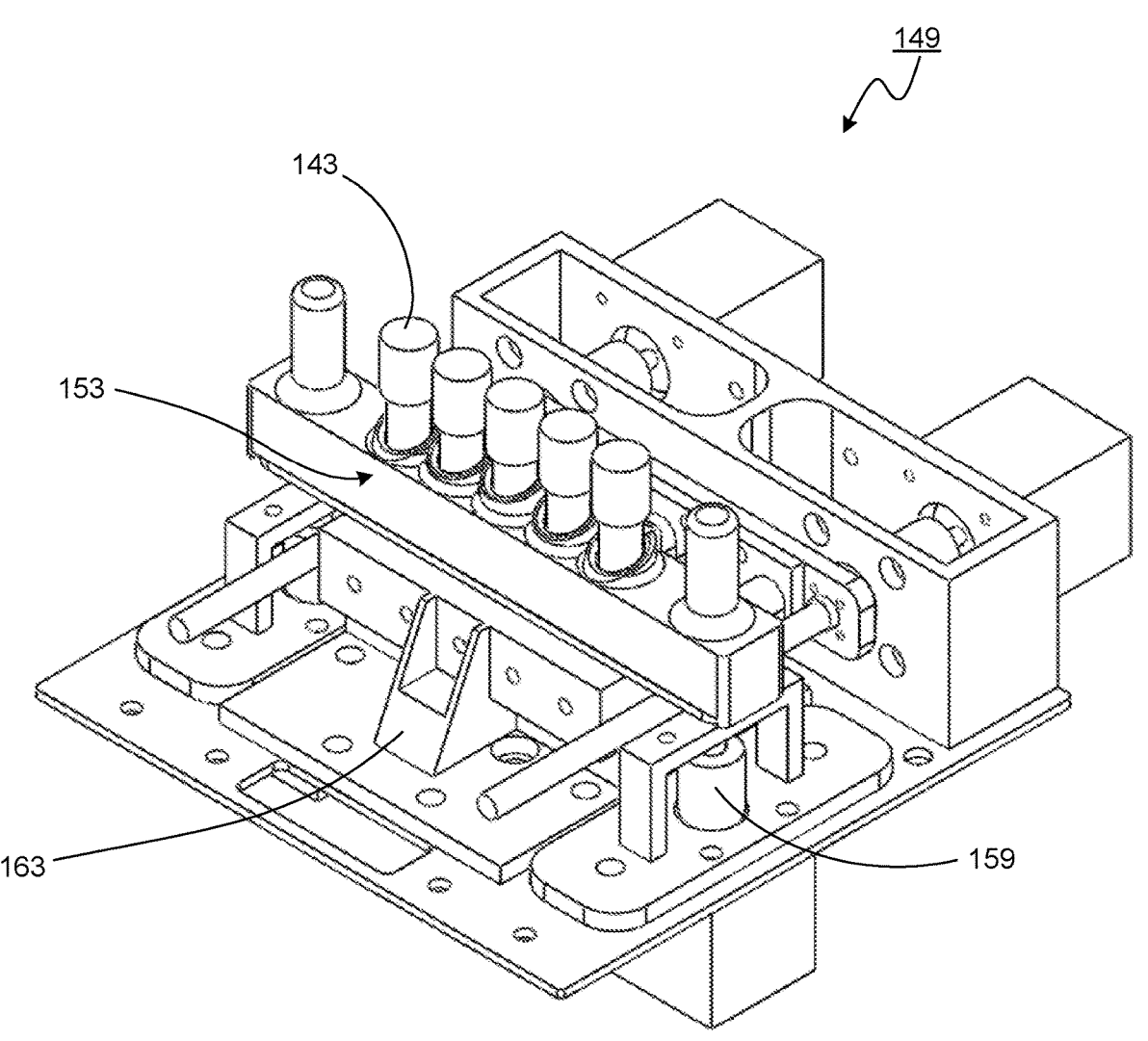
FIG. 9 is an example perspective view of a robotic decapper according to various embodiments of the present disclosure.
Figure 10:
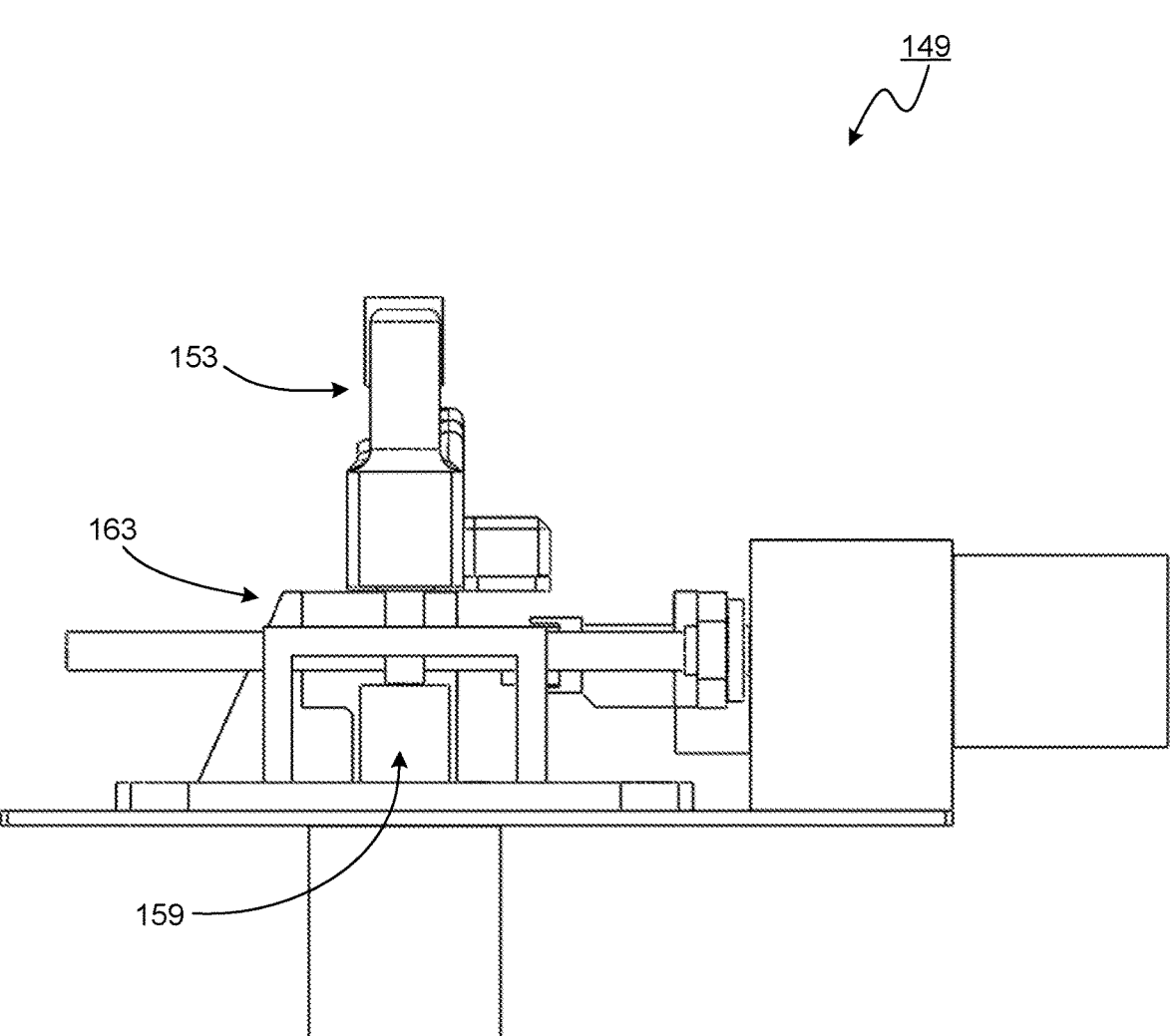
FIG. 10 is an example side view of a robotic decapper according to various embodiments of the present disclosure.
Figure 11:
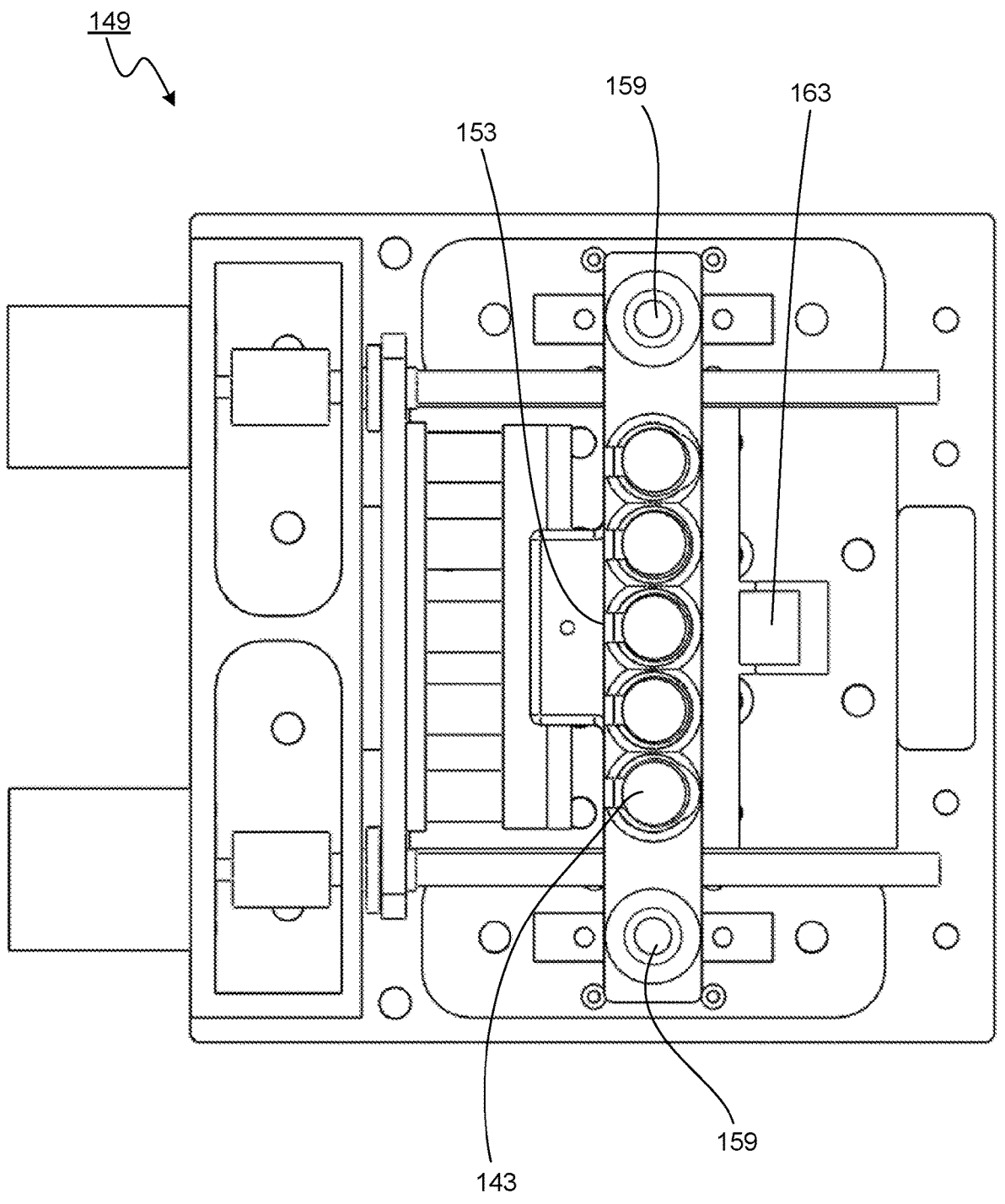
FIG. 11 is an example top view of a robotic decapper according to various embodiments of the present disclosure.

With reference to FIG. 9, shown is an example of a decapper 149*a*. In some embodiments, the decapper 149*a* can comprise a plurality of sleeves 153 arranged in a substantially parallel configuration. Individual sleeves 153 can be hollow and configured to receive collection containers 136. Individual sleeves 153 can also be open on both ends to permit sliding of the sleeves 153 over the collection containers 136. Individual sleeves 153 can be configured to slide over collection containers 136, while dimensioned to intercept the cap 143 of the collection container 136. FIG. 10 is a side view of an example decapper 149*a*. FIG. 11 is a top view of an example decapper 149*a*.

Figure 12:
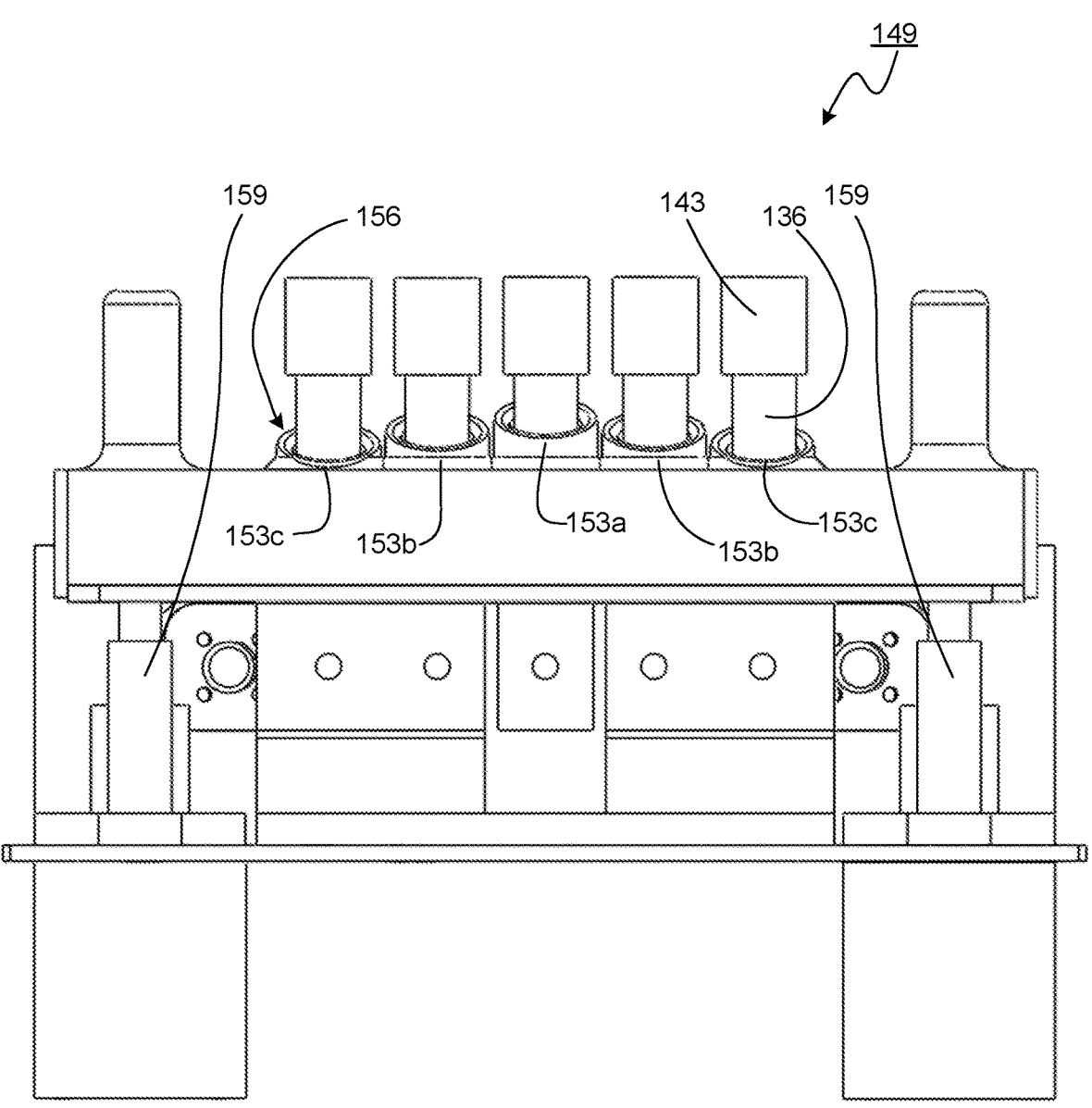
FIG. 12 is an example front view of a robotic decapper according to various embodiments.

With respect to FIG. 12, shown is a front view of an example decapper 149*a*. In some embodiments, a first opening 156 (FIG. 12) of individual sleeves 153 is angularly truncated. In some embodiments, a center sleeve 153*a* (FIG. 12) can be positioned higher than the sleeves 153 on either side of the center sleeve 153*a*. In some embodiments, the sleeves 153 are arranged in a step-down manner such that the center sleeve 153*a* is the highest, the sleeves 153*b* immediately adjacent to the center sleeve 153*a* are lower than the center sleeve 153*a*, and the outermost sleeves 153*c* are lower than the immediately adjacent sleeves 153*b*.

The plurality of sleeves 153 can be interconnected such that the sleeves can be moved together, as seen in FIGS. 9, 11, and 12. In some embodiments, individual sleeves 153 can move separately. The plurality of sleeves 153 can be moved in a linear direction along an axis of the collection containers 136. This linear motion of the plurality of sleeves 153 can be implemented by connecting the plurality of sleeves 153 to one or more extenders 159. An example of an extender 159 would be a scissor extender, telescoping member, linear actuator (i.e., screw type, wheel and axle type, cam, hydraulic, pneumatic, piezoelectric, or any other form of linear actuator), or any other form of linear extender. When the decapper 149*a* receives the collection containers 136 in the plurality of sleeves 153, the extender(s) 159 can be activated to slide the plurality of sleeves 153 up the collection containers 136 until the angularly truncated openings of the plurality of sleeves 153 encounter the caps 143. The extender(s) 159 can continue to drive the sleeves 153 after encountering resistance from the caps 143 until the caps 143 are forced free from the respective collection containers 136.

In some embodiments, the decapper 149*a* can include a cap receptacle 163 positioned below the plurality of sleeves 153. The cap receptacle 163 can be configured as tray, chute, funnel, or other structure capable of catching and collecting the caps 143 from collection containers 136 after the caps 143 have been removed. As seen in FIG. 9, some embodiments may have the cap receptacle 163 positioned on a side of the plurality of sleeves 153 which corresponds to the lower side of the angularly truncated openings on the sleeves 153. Thus, the upper side of the angularly truncated opening will encounter the cap 143 first and push on that side of the cap 143 first. As the sleeves 153 progress further along the collection containers 136, the cap 143 eventually comes loose and will fall toward the lower side of the angularly truncated sleeve 153, to be caught by the cap receptacle 163. In some embodiments, the cap receptacle 163 can be positioned centrally under the plurality of sleeves 153 and be large enough to catch falling caps 143 from any side of the plurality of sleeves 153 as the caps 143 are removed from the collection containers 136.

Figure 13:
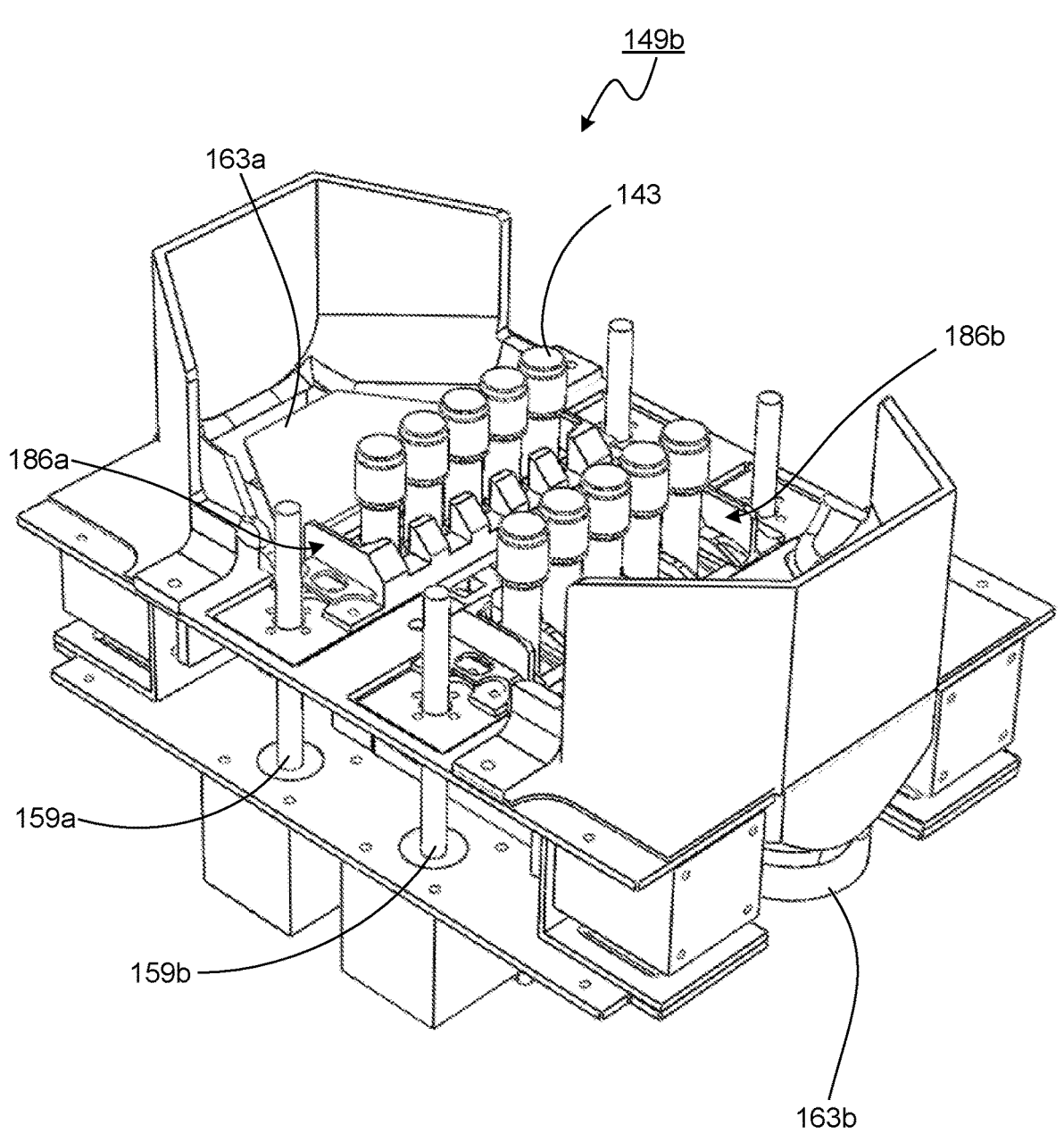
FIG. 13 is an example perspective view of a robotic decapper according to various embodiments of the present disclosure.

Moving next to FIG. 13, shown is an example perspective view of a multi-row robotic decapper 149*b* according to various embodiments. The multi-row decapper 149*b* can comprise two or more rows of sleeves 153 which can be mechanically operated to lift caps 143 off collection containers 136. In some embodiments, the decapper 149*b* can include one or more decapping members 186 which can be used instead of sleeves 153. The decapping members 186 are described in further detail in the discussion of FIGS. 18 and 19.

Figure 14:
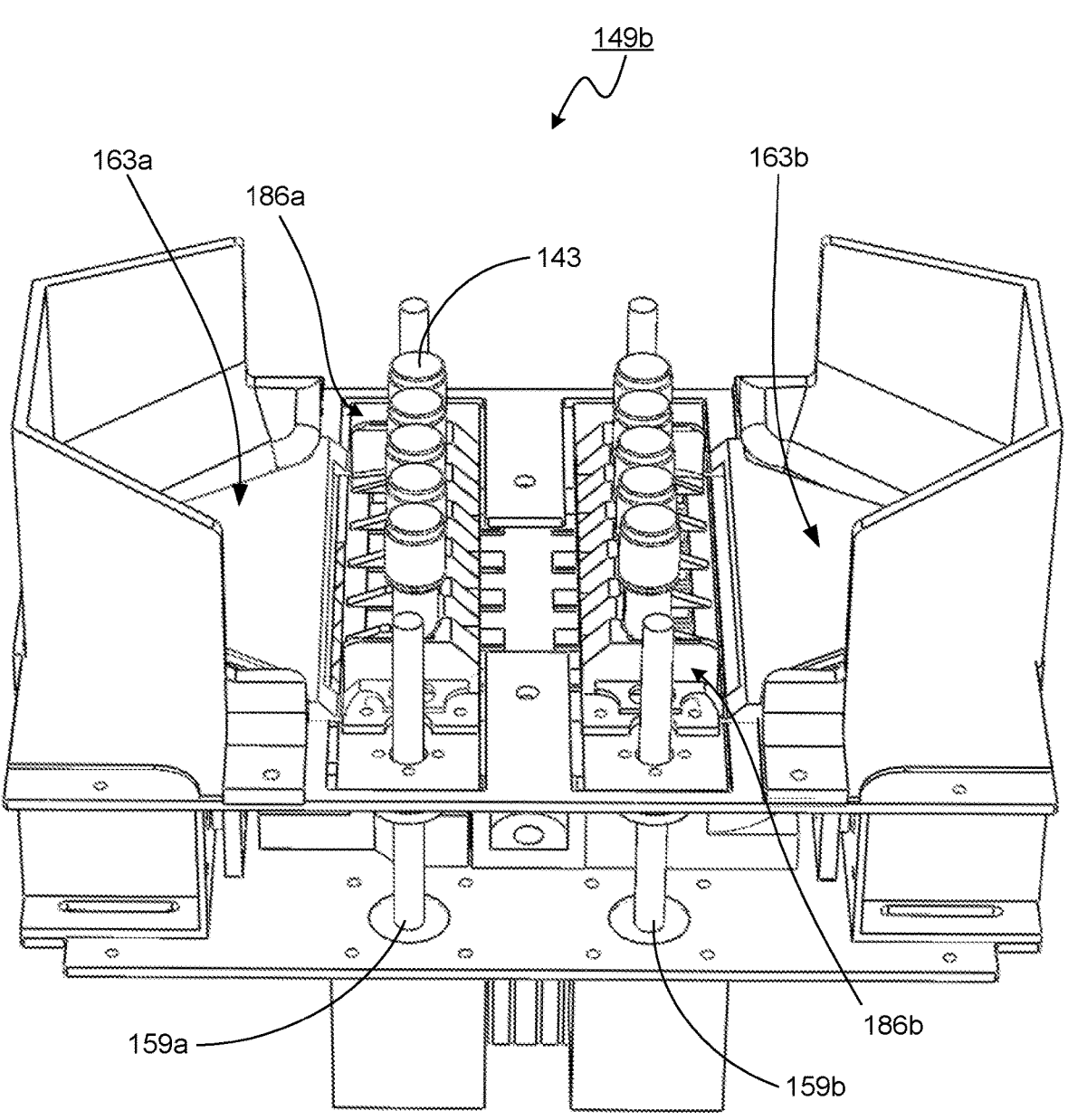
FIG. 14 is an example perspective view of a robotic decapper according to various embodiments of the present disclosure.
Figure 15:
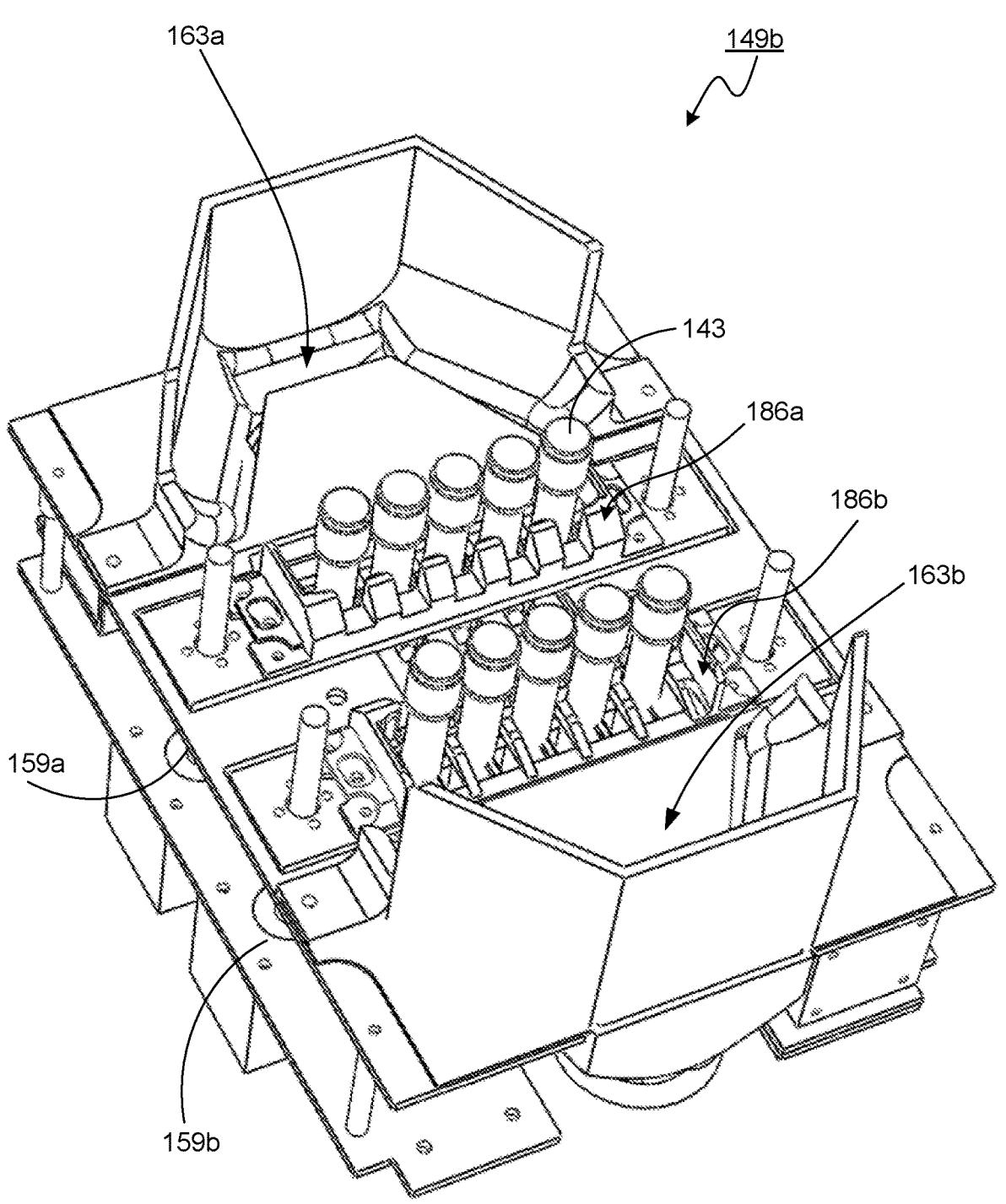
FIG. 15 is an example perspective view of a robotic decapper according to various embodiments of the present disclosure.

In a multi-row decapper 149*b*, as depicted in FIGS. 13, 14, and 15, the decapper 149*b* can include multiple cap receptacles 163. As shown in FIG. 13, each row of decapping members 186*a*, 186*b* can have a respective cap receptacle 163*a*, 163*b* configured to collect the caps 143 after they have been removed. The cap receptacles 163 can include one or more walls positioned on an opposite side of an opening from the decapping member 186. The one or more walls can direct loose caps 143 into the opening. In some embodiments, the decapper 149*b* can include one or more extenders 159 to lift and lower the decapping members 186. In some embodiments, each decapping member 186 can be operated by two extenders 159.

Figure 16:
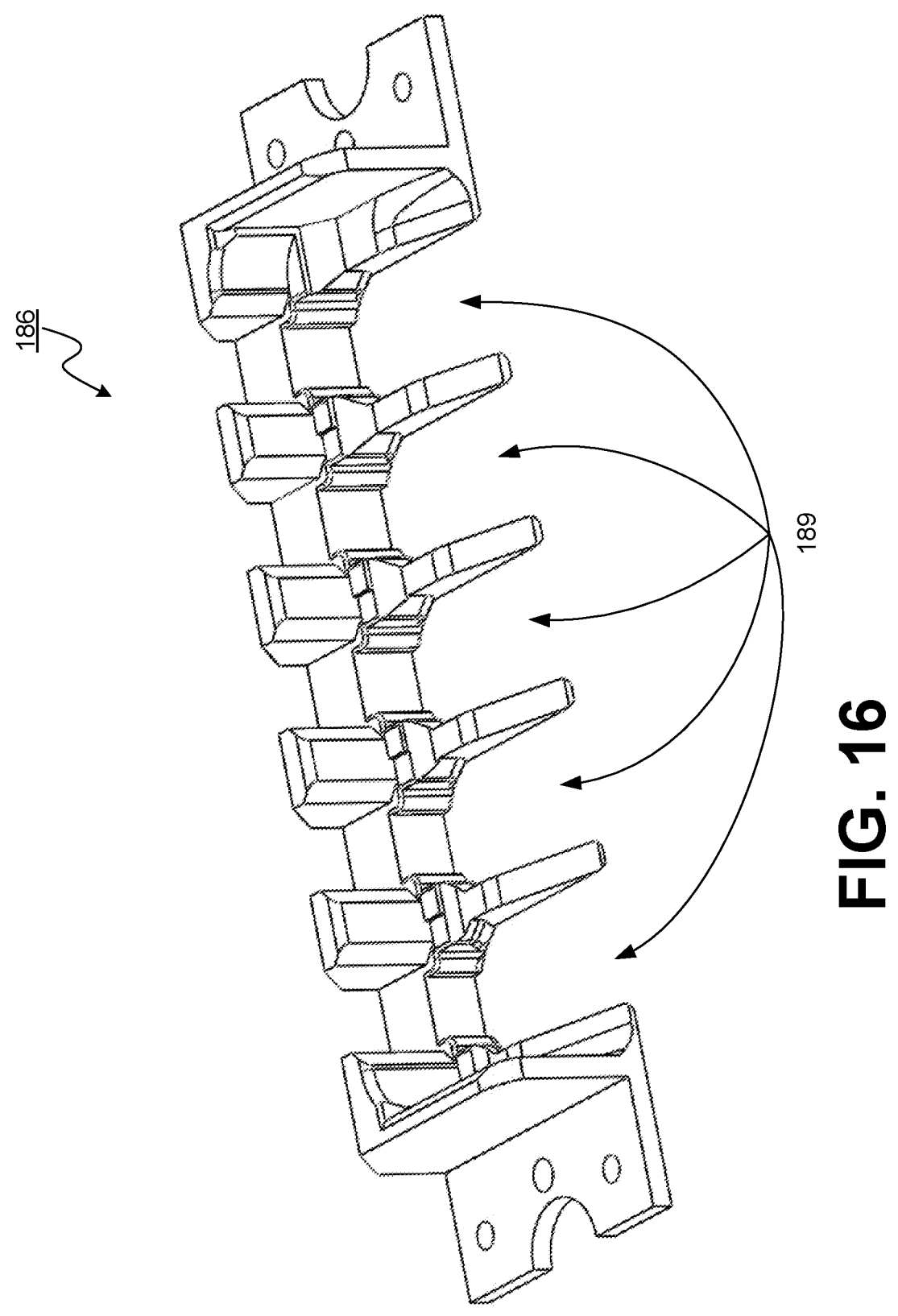
FIG. 16 is an example perspective view of a decapping member according to various embodiments of the present disclosure.
Figure 17:
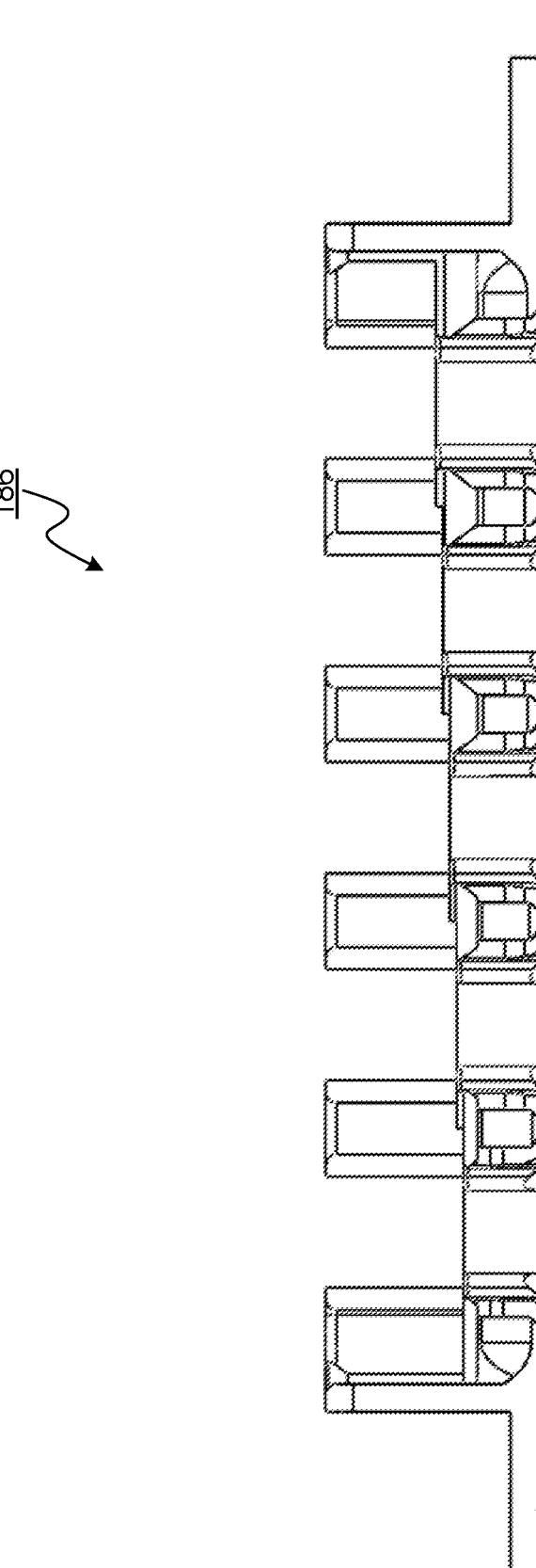
FIG. 17 is an example side view of a decapping member according to various embodiments of the present disclosure.
Figure 17:

Next, at FIGS. 16 and 17, shown are two different views of the decapping members 186 which can be used in place of sleeves 153 for any of the decappers 149 described herein. A capping member 186 can comprise one or more receiving slots 189. Each receiving slot 189 can be configured to receive a collection container 136. The receiving slots 189 can be representative of an empty space between a back wall and two sidewalls as shown in FIGS. 16 and 17. In some embodiments, the receiving slots 189 can be curved, angled, or otherwise contoured to fit the collection containers 136. The receiving slots 189 can include cap-removing structures configured to slide up the collection containers 136 and intercept the cap 143.

Figure 18:
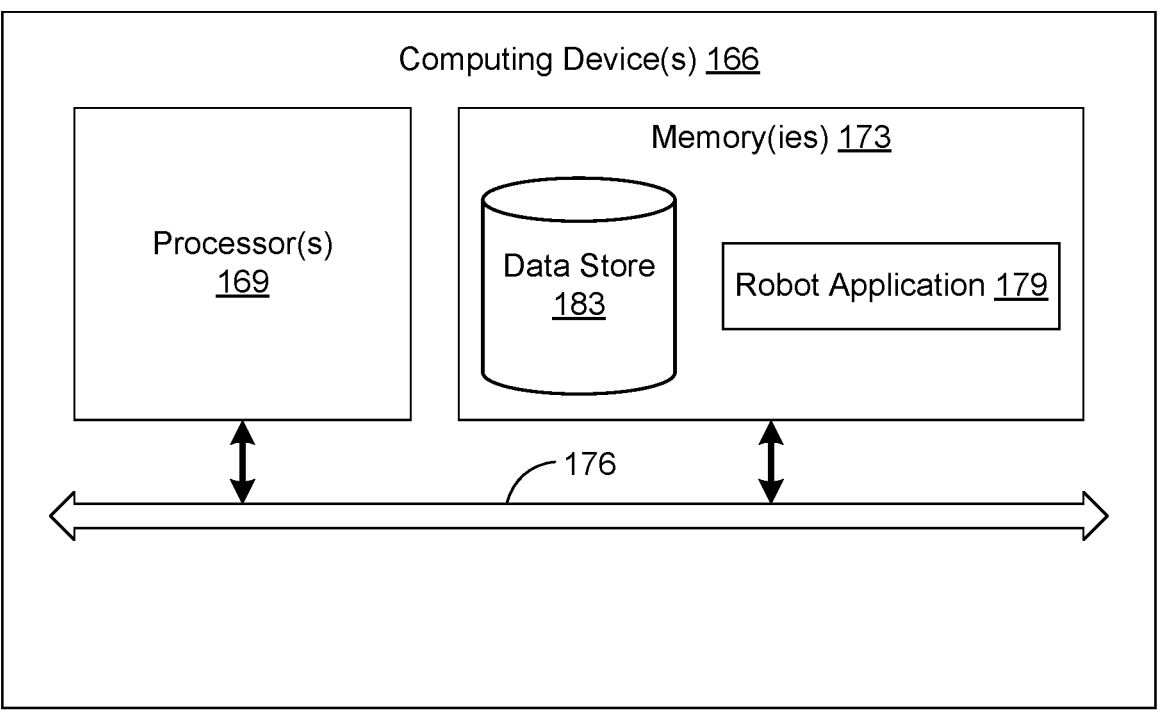
FIG. 18 is an example of a computing device according to various embodiments of the present disclosure.

With respect to FIG. 18, shown is a schematic block diagram of one or more computing devices 166. Each computing device 166 includes at least one processor circuit, for example, having a processor 169 and a memory 173, both of which can be coupled to a local interface 176. To this end, each computing device 166 can comprise, for example, at least one server computer or like device. The local interface 176 may comprise, for example, a data bus with an accompanying address/control bus or other bus structure as can be appreciated.

Stored in the memory 173 are both data and several components that are executable by the processor 169. In particular, stored in the memory 173 and executable by the processor 169 can be a robot application 179 and potentially other applications. Also stored in the memory 173 may be a data store 183 and other data. In addition, an operating system may be stored in the memory 173 and executable by the processor 169.

It is understood that there may be other applications that are stored in the memory 173 and are executable by the processor 169 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 173 and are executable by the processor 169. In this respect, the term "executable" means a program file that is in a form that can ultimately be run by the processor 169. Examples of executable programs may be, for example, a compiled program that can be translated into machine code in a format that can be loaded into a random access portion of the memory 173 and run by the processor 169, source code that may be expressed in proper format such as object code that is capable of being loaded into a random access portion of the memory 173 and executed by the processor 169, or source code that may be interpreted by another executable program to generate instructions in a random access portion of the memory 173 to be executed by the processor 169, etc. An executable program may be stored in any portion or component of the memory 173 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 173 is defined herein as including both volatile and nonvolatile memory and data storage components. Volatile components are those that do not retain data values upon loss of power. Nonvolatile components are those that retain data upon a loss of power. Thus, the memory 173 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random-access memory (SRAM), dynamic random-access memory (DRAM), or magnetic random-access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 169 may represent multiple processors 169 and/or multiple processor cores and the memory 173 may represent multiple memories 173 that operate in parallel processing circuits, respectively. In such a case, the local interface 176 may be an appropriate network that facilitates communication between any two of the multiple processors 169, between any processor 169 and any of the memories 173, or between any two of the memories 173, etc. The local interface 176 may comprise additional systems designed to coordinate this communication, including, for example, performing load balancing. The processor 169 may be of electrical or of some other available construction.

Although the robot application 179 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Figure 19:
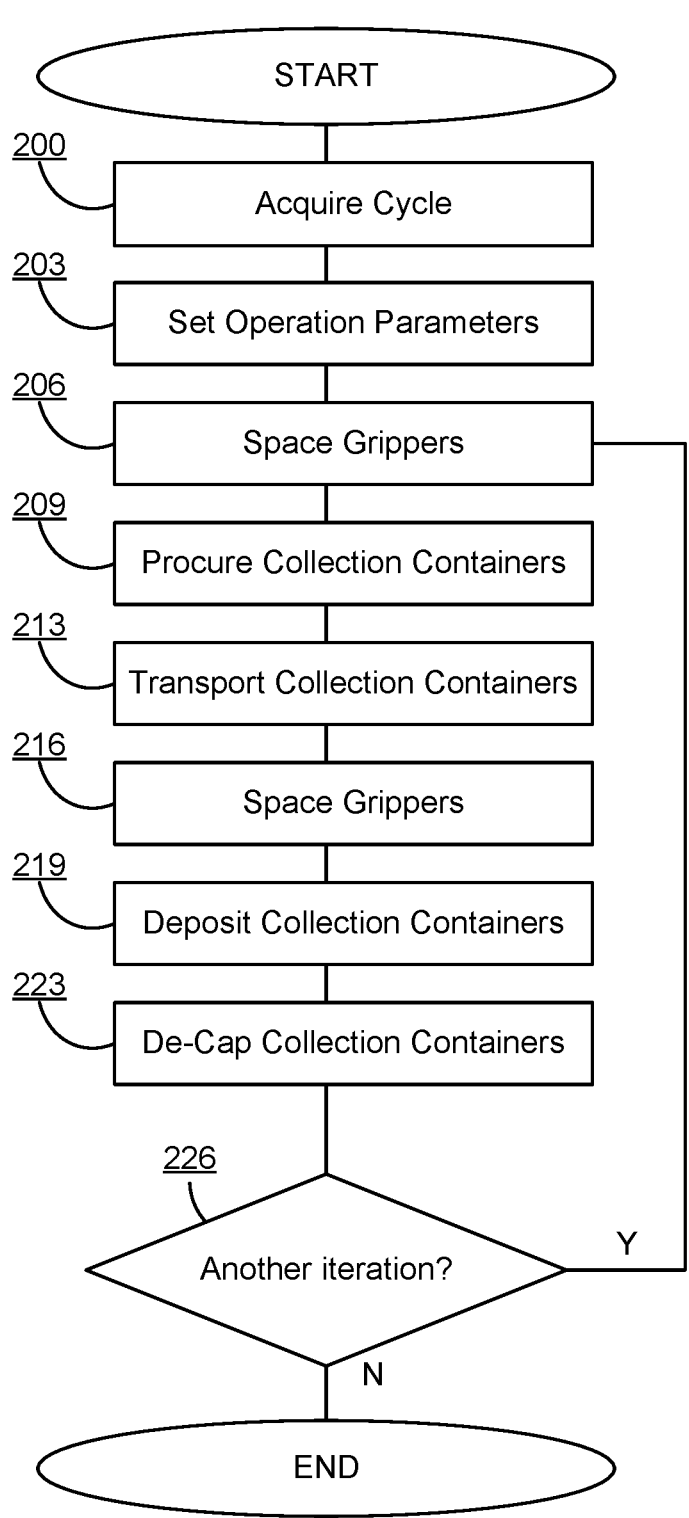
FIG. 19 is a flowchart illustrating an example method for moving and de-capping collection containers.

Referring next to FIG. 19, shown is a flowchart that provides one example of the operation of the robotic arm 100 and decapper 149 system. The flowchart of FIG. 19 provides merely an example of the many different types of functional arrangements that can be employed to implement the operation of the system. Alternatively, the flowchart of FIG. 19 could be viewed as depicting a method implemented by the robot application 179.

Beginning at block 200, the robot application 179 can acquire a cycle to perform from the data store 183. In some embodiments, the cycle can be acquired from a user input. The cycle can define what the robotic arm 100 and decapper 149 will be doing with collection containers 136 and how many iterations will be needed.

At block 203, the robot application 179 can set operation parameters based at least in part on the cycle. Operation parameters can include at least a procurement location, a procurement spacing, a deposit location, and a deposit spacing.

At block 206, the robot application 179 can cause the robotic arm 100 to space individual grippers 103 according to the procurement spacing. In some embodiments, this can be accomplished by raising the vertical shaft 106 to a specified height, which in turn raises the plate 116 and the angled tracks 119 drive the grippers 103 apart via the extension elements 126.

At block 209, the robot application 179 can procure the collection containers 136 from the procurement location. The procurement location can be a storage rack, centrifuge, or other location where collection containers 136 are awaiting transfer. The robot application 179 can cause the robotic arm 100 to move to the procurement location, align the grippers 103 with the collection containers 136, lower the grippers 103 over the collection containers 136, and grip the collection containers 136.

Next, at block 213, the robot application 179 can cause the robotic arm 100 to transport the collection containers 136 to another location. In some embodiments, the second location can be the decapper 149 or other deposit location such as a storage rack, a centrifuge, or other location.

At block 216, the robot application 179 can cause the robotic arm 100 to space the grippers according to the deposit spacing. In some embodiments, the procurement spacing and the deposit spacing may be the same spacing. In this case, the robot application 179 can skip this step of spacing the grippers according to the deposit spacing.

At block 219, the robot application 179 can deposit the collection containers 136 at the deposit location. The robot application 179 can cause the robotic arm 100 to move to the deposit location, align the collection containers 136 with the deposit location, lower the collection containers 136, and release the collection containers 136. As discussed above, in some embodiments, the deposit location is the decapper 149.

At block 223, if the deposit location is the decapper 149, the robot application 179 can cause the decapper to de-cap the collection containers 136. The robot application 179 can cause the extenders 159 of the decapper 149 to raise the plurality of sleeves 153 and remove the caps 143 from the collection containers 136.

At block 226, the robot application 179 can determine whether another iteration of the cycle is needed. A user can enter the number of iterations necessary when selecting the cycle to be run. Alternatively, the cycle has a preset number of iterations to perform. In some embodiments, the robot application 179 can notify a user each time an iteration is complete, and request an acknowledgement that the user is ready for a next iteration. Once the robot application 179 has determined that another iteration is needed, it can perform the steps of blocks 206-226 again until a determination is made that there are no more iterations to be performed. If no more iterations are to be performed, the process can end.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A robot system for moving and de-capping collection containers, the system comprising:
   a robotic arm having a plurality of grippers, the plurality of grippers configured to move a plurality of collection containers;
   a decapper configured to remove a plurality of caps corresponding to the plurality of collection containers;
   a computing device comprising a processor and a memory; and
   machine-readable instructions stored in the memory that, when executed by the processor, cause the computing device to at least:
      align the plurality of grippers with the plurality of collection containers, the plurality of grippers connected to a distal end of the robotic arm;
      cause the plurality of grippers to grip the plurality of collection containers;
      move the plurality of collection containers to the decapper; and
      de-cap the collection containers.

2. The system of claim 1, further comprising a cap receptacle positioned below the decapper.

3. The system of claim 1, wherein the machine-readable instructions, when executed, further cause the computing device to at least:
   identify a degree of separation based on a distance between the plurality of collection containers;
   determine a height level, the height level corresponding to the degree of separation;
   raise a plate to the height level, the plate having a plurality of angled tracks; and
   cause a plurality of grippers to separate to the degree of separation, individual of the plurality of grippers having an extension element positioned to fit in a respective angled track and being driven apart by the angled tracks as the plate rises.

4. The system of claim 1, wherein the decapper comprises:
   a plurality of sleeves arranged in parallel, individual sleeves configured to receive a capped collection container; and
   at least one extender configured to raise and lower the plurality of sleeves.

5. The system of claim 4, wherein the plurality of sleeves are configured in a plurality of adjacent rows.

6. The system of claim 4, wherein individual sleeves have a first opening and a second opening, the first opening being angularly truncated and dimensioned to remove a cap of the capped collection container.

7. The system of claim 1, wherein individual grippers of the plurality comprise a first finger and a second finger, individual grippers configured to hold a collection container between the first finger and the second finger.

8. The system of claim 7, wherein the first finger includes a ledge at a distal end of the first finger, the ledge configured to support a cap of a collection container.

9. The system of claim 1, wherein the robotic arm comprises:
  a vertical shaft;
  a plate positioned at a distal end of the vertical shaft, the plate having a plurality of angled tracks;
  a horizontal member positioned proximal to the distal end of the vertical shaft, the horizontal member positioned adjacent to the plate; and
  the plurality of grippers positioned along the horizontal member, individual grippers having an extension element positioned to fit in a respective angled track, individual grippers configured to slide along the horizontal member.

10. The system of claim 9, wherein the vertical shaft includes a cogged section along at least a portion of a first side, and further comprising a motor configured to turn a cogwheel, the cogwheel positioned against the cogged section of the vertical shaft.

11. The system of claim 9, wherein the plurality of grippers are configured to slide along the horizontal member.

12. The system of claim 9, wherein individual angled tracks comprise an indentation in the plate.

13. The system of claim 9, wherein individual angled tracks comprise a slotted hole through the plate.

14. The system of claim 9, wherein the extension element includes a wheel configured to roll inside the respective angled track.

15. The system of claim 9, wherein the plurality of angled tracks comprise:
  a first pair of angled tracks;
  a second pair of angled tracks in between the first pair of angled tracks;
  a center angled track in between the second pair of angled tracks; and
  the first pair of angled tracks are equally angled away from the second pair of angled tracks, the second pair of angled tracks are equally angled away from the center angled track, and the center angled track is vertical.

* * * * *